United States Patent
Arakawa et al.

(10) Patent No.: US 12,487,326 B2
(45) Date of Patent: Dec. 2, 2025

(54) COMMUNICATION APPARATUS AND COMMUNICATION METHOD

(71) Applicant: Murata Manufacturing Co., Ltd., Nagaokakyo (JP)

(72) Inventors: Nobuya Arakawa, Nagaokakyo (JP); Katsuhisa Kashiwagi, Nagaokakyo (JP); Ryo Saito, Nagaokakyo (JP); Koichi Ichige, Yokohama (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 551 days.

(21) Appl. No.: 17/966,914

(22) Filed: Oct. 17, 2022

(65) Prior Publication Data
US 2023/0033166 A1    Feb. 2, 2023

Related U.S. Application Data

(63) Continuation of application No. PCT/JP2021/014861, filed on Apr. 8, 2021.

(30) Foreign Application Priority Data

Apr. 17, 2020 (JP) .................. 2020-074369

(51) Int. Cl.
*G01S 7/35* (2006.01)
*G01S 13/42* (2006.01)

(52) U.S. Cl.
CPC .............. *G01S 7/354* (2013.01); *G01S 13/42* (2013.01)

(58) Field of Classification Search
CPC .................. G01S 7/354; G01S 13/42
See application file for complete search history.

(56) References Cited

U.S. PATENT DOCUMENTS

2004/0178951 A1* 9/2004 Ponsford .................. G01S 7/32
                                                            342/194
2008/0231505 A1   9/2008 Zhu et al.
(Continued)

FOREIGN PATENT DOCUMENTS

JP    2006-153579 A    6/2006
JP    2009-162688 A    7/2009
(Continued)

OTHER PUBLICATIONS

International Search Report and Written Opinion mailed on Jun. 29, 2021, received for PCT Application PCT/JP2021/014861, filed on Apr. 8, 2021, 8 pages including English Translation.

(Continued)

*Primary Examiner* — William Kelleher
*Assistant Examiner* — Hailey R Le
(74) *Attorney, Agent, or Firm* — XSENSUS LLP

(57) ABSTRACT

A communication apparatus capable of estimating the number of incoming waves with high accuracy is provided. A communication apparatus includes an antenna, a matrix calculator that calculates, based on reception signals received from the antenna, a first matrix having singular values of a reception signal matrix, a matrix calculator that extracts reception signals whose frequency is within a specific frequency range from the reception signals and calculates, based on the extracted reception signals, a second matrix having singular values of a second reception signal matrix, and a number-of-incoming-waves estimator that estimates, based on the first matrix and the second matrix, the number of incoming waves of the reception signals.

20 Claims, 6 Drawing Sheets

(56) References Cited

U.S. PATENT DOCUMENTS

| | | | | |
|---|---|---|---|---|
| 2013/0057432 A1* | 3/2013 | Rajagopal | ............ | H01Q 25/002 |
| | | | | 342/368 |
| 2017/0098891 A1* | 4/2017 | Nishimoto | .............. | G01S 13/42 |
| 2017/0293025 A1* | 10/2017 | Davis | ..................... | G01S 7/0233 |
| 2018/0365975 A1* | 12/2018 | Xu | ....................... | G08B 29/185 |
| 2020/0132825 A1* | 4/2020 | Jungmaier | .............. | G01S 7/352 |
| 2021/0199757 A1* | 7/2021 | Oshima | ..................... | G01S 3/74 |
| 2022/0018936 A1* | 1/2022 | Iizuka | ....................... | G01S 7/41 |

FOREIGN PATENT DOCUMENTS

| | | |
|---|---|---|
| JP | 2014-112508 A | 6/2014 |
| WO | 2008/105748 A1 | 9/2008 |

OTHER PUBLICATIONS

Written Opinion of the International Searching Authority mailed on Jun. 29, 2021, received for PCT Application PCT/JP2021/014861, filed on Apr. 8, 2021, 3 pages. (Previously filed; submitting English translation only.).

\* cited by examiner

COMMUNICATION APPARATUS AND COMMUNICATION METHOD

CROSS-REFERENCE TO RELATED APPLICATIONS

The present application is a continuation application of International Patent Application No. PCT/JP2021/014861, filed Apr. 8, 2021, which claims priority to Japanese Patent Application No. 2020-074369, filed Apr. 17, 2020, the entire contents of each of which being incorporated herein by reference.

TECHNICAL FIELD

The present disclosure relates to a communication apparatus and a communication method.

BACKGROUND ART

Radio waves are used for object detection and information communications. Radars are used for detection of objects. For example, a radar receives, through an array antenna, a reflected wave as an incoming wave, which is generated from a transmission wave reflected from an object. Such radars include FMCW (Frequency Modulated Continuous Wave) radars. Radars such as FMCW radars conducting electronic scanning employ various direction-of-arrival estimation methods as techniques for detecting the direction of arrival of an incoming wave. Furthermore, in information communications, the direction of arrival of an incoming wave arriving at a communication apparatus is also estimated so that efficiency of communication can be increased.

There are methods for estimating the number of incoming waves and using the estimated number of incoming waves for estimation of the direction of arrival. Such direction-of-arrival estimation methods include, for example, a MUSIC (MUltiple SIgnal Classification) method. The MUSIC method is a method categorized as a super-resolution algorithm among direction-of-arrival estimation methods. In an electronic scanning radar described in Patent Document 1, a method is described for calculating a correlation matrix of reception signals from an array antenna and normalizing eigenvalues of the correlation matrix. A method is described in Patent Document 1 for estimating the number of incoming waves on the basis of a uniform threshold, which is provided for normalized eigenvalues, without depending on a Radar Cross-Section (RCS) of an object or the like.

CITATION LIST

Patent Document

Patent Document 1: Japanese Unexamined Patent Application Publication No. 2009-162688

SUMMARY

Technical Problems

The method described in Patent Document 1 has a problem that, because electric power of a reception signal for an object with a small RCS is small even in the case where correlation is reduced, an incoming wave from the object and noise cannot be distinguished from each other easily and the accuracy of estimation of the number of incoming waves decreases.

Thus, consistent with the present disclosure, it would be preferable to provide a communication apparatus that is capable of estimating the number of incoming waves with high accuracy.

Solution to Problems

A communication apparatus according to the present disclosure includes: a plurality of antennas; and circuitry configured to: calculate, based on reception signals received from the antennas, a first matrix having singular values of a first reception signal matrix; extract reception signals whose frequency is within a specific frequency range from the reception signals; calculate, based on the extracted reception signals, a second matrix having singular values of a second reception signal matrix; and estimate, based on the first matrix and the second matrix, the number of incoming waves of the reception signals.

A communication method for use in a communication apparatus according to another aspect of the present disclosure includes: calculating, based on reception signals received from a plurality of antennas, a first matrix having singular values or eigenvalues of a first reception signal matrix; extracting, based on the reception signals, reception signals whose frequency is within a specific frequency range and calculating a second matrix having singular values or eigenvalues of a second reception signal matrix having components based on the extracted reception signals, the calculating the second matrix including converting the reception signals into reception signals of frequency domain, generating, based on the reception signals of frequency domain, extracted reception signals of frequency domain, converting the extracted reception signals of frequency domain into extracted reception signals of time domain, and calculating, based on the extracted reception signals of time domain, the second matrix of the second reception signal matrix; and estimating, based on the first matrix and the second matrix, the number of incoming waves of the reception signals.

Advantageous Effects

According to the present disclosure, a communication apparatus can be provided that is capable of estimating the number of incoming waves with high accuracy.

DESCRIPTION OF EMBODIMENTS

Figure 1:
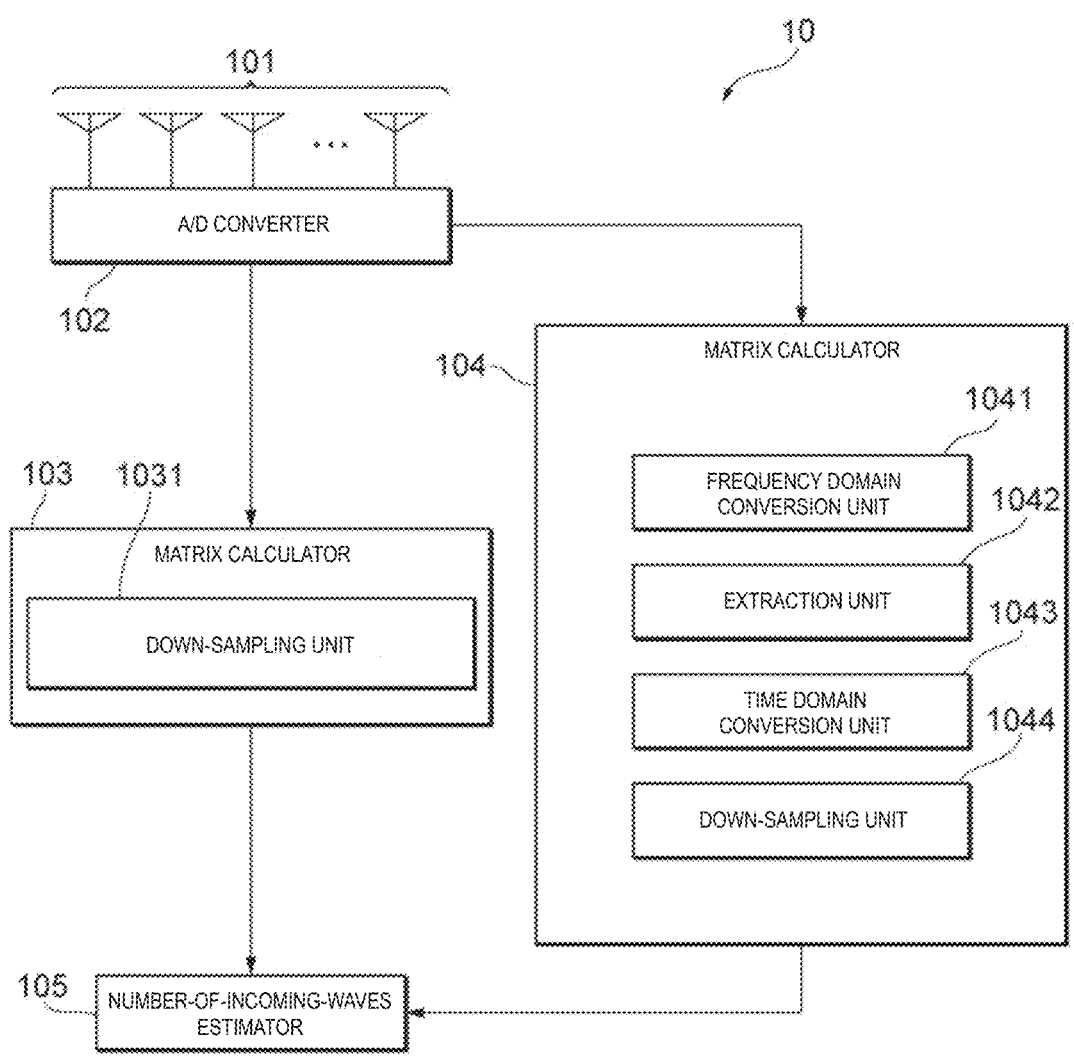
FIG. 1 is a block diagram of a communication apparatus according to a first embodiment.

Hereinafter, embodiments of the present disclosure will be described in detail with reference to drawings. The same signs are provided to the same elements, and duplicate description will be omitted as much as possible.

A communication apparatus 10 according to a first embodiment will be described. The communication apparatus 10 according to the first embodiment includes an antenna 101, an A/D converter 102, a matrix calculator 103 (first matrix calculator), a matrix calculator 104 (second matrix calculator), and a number-of-incoming-waves estimator 105.

The antenna 101 is an array antenna in which a plurality of antenna elements are arranged along a predetermined direction. External signals are input to the antenna 101, and reception signals are output from the antenna 101 to the A/D converter 102. Reception signals for the individual antenna elements are output. The antenna 101 may be capable of both reception and transmission of signals.

The A/D converter 102 converts reception signals, which are analog signals from the antenna 101, into digital signals. A typical analog-digital conversion circuit may be used as the A/D converter 102. For example, for an analog-digital conversion circuit, various types such as flash type, pipelined type, successive approximation type, delta-sigma type, and double integrating type may be used.

The matrix calculator (or circuit) 103 includes a down-sampling unit (or circuit) 1031 (first down-sampling unit). The down-sampling unit 1031 down-samples reception signals of time domain to generate a reception signal matrix (first reception signal matrix). Down-sampling represents processing for performing conversion to reduce the sampling frequency of a sampled signal. The matrix calculator 103 calculates a matrix (first matrix) having singular values of a reception signal matrix (first reception signal matrix) having components based on reception signals. Matrix calculator 103 includes processing circuitry, such as a programmable processor (e.g., CPU) and memory that holds the program instructions, and/or dedicated logic such as an application specific integrated circuit (ASIC). Each of the units can similarly include such processing circuitry, memory, instructions and/or dedicated logic.

A case where the matrix calculator 103 calculates singular values of a reception signal matrix will be described. The matrix calculator 103 generates a reception signal matrix as in the left-hand side of Equation (1), where the number of antennas of the antenna 101 is represented by M and reception signals from the individual antenna elements are represented by values $x_1$ to $x_M$, and performs singular value decomposition of the reception signal matrix.

[Math. 1]

$$\begin{bmatrix} x_{\frac{M}{2}+1} & x_{\frac{M}{2}} & \cdots & x_1 \\ x_{\frac{M}{2}+2} & x_{\frac{M}{2}+1} & \cdots & x_2 \\ \vdots & \vdots & \ddots & \vdots \\ x_M & \cdots & \cdots & x_{\frac{M}{2}} \end{bmatrix} = U \begin{bmatrix} \sigma_1 & \cdots & 0 & 0 \\ \vdots & \ddots & \vdots & \vdots \\ 0 & \cdots & \sigma_{\frac{M}{2}} & 0 \end{bmatrix} V \quad (1)$$

A singular value matrix (first singular value matrix) having M/2 singular values as components are indicated in the right-hand side of Equation (1), where singular values are represented by $\sigma_k$ (k represents an integer from 1 to M/2). Individual singular values correspond to electric powers of reception signals. Specifically, each singular value corresponds to electric power based on an independent wave configuring a reception signal. A singular value decreases as the row number of a singular value matrix increases. That is, a signal with a larger electric power value is in a row with a smaller row number. Because the electric power value of an incoming wave signal is considered to be larger than the electric power value of a noise signal, a singular value equal to or larger than a certain value corresponds to an incoming wave. Hereinafter, a row number will be referred to as a singular value number.

The matrix calculator (or circuit) 104 includes a frequency domain conversion unit (or circuit) 1041, an extraction unit (or circuit) 1042, a time domain conversion unit (or circuit) 1043, and a down-sampling unit (or circuit) 1044 (second down-sampling unit). Matrix calculator 104 includes processing circuitry, such as a programmable processor (e.g., CPU) and memory that holds the program instructions, and/or dedicated logic such as an application specific integrated circuit (ASIC). Each of the units can similarly include such processing circuitry, memory, instructions and/or dedicated logic.

The frequency domain conversion unit 1041 converts a time domain signal into a frequency domain signal. Specifically, the frequency domain conversion unit 1041 can perform a Fourier transform. The time domain conversion unit 1043 converts a frequency domain signal to a time domain signal. Specifically, the time domain conversion unit 1043 can perform an inverse Fourier transform.

The extraction unit 1042 extracts a signal whose frequency is lower than a predetermined threshold. That is, the extraction unit 1042 is, for example, a low pass filter. Other examples of the extraction unit 1042 include a band pass filter and a band elimination filter. In extraction of a signal whose frequency is lower than the predetermined threshold, for example, the extraction unit 1042 defines a signal whose frequency is higher than the predetermined threshold as 0.

The down-sampling unit 1044 down-samples reception signals of time domain to generate a reception signal matrix (second reception signal matrix).

The matrix calculator 104 calculates a matrix (second matrix) having singular values of a reception signal matrix (second reception signal matrix) having components based on reception signals extracted by the extraction unit 1042.

A case where the matrix calculator 104 calculates singular values of a reception signal matrix will be described. The number of antennas of the antenna 101 is represented by M. Reception signals of low frequency components extracted by the extraction unit 1042 from reception signals from the antenna elements are represented by values $y_1$ to $y_M$, where the reception signals from the antenna elements are represented by values $x_1$ to $x_M$. At this time, the matrix calculator 104 generates a reception signal matrix as in the left-hand side of Equation (2) and performs singular value decomposition of the reception signal matrix.

[Math. 2]

$$\begin{bmatrix} x_{\frac{M}{2}+1} & x_{\frac{M}{2}} & \cdots & x_1 \\ x_{\frac{M}{2}+2} & x_{\frac{M}{2}+1} & \cdots & x_2 \\ \vdots & \vdots & \ddots & \vdots \\ x_M & \cdots & \cdots & x_{\frac{M}{2}} \end{bmatrix} = U \begin{bmatrix} \sigma'_1 & \cdots & 0 & 0 \\ \vdots & \ddots & \vdots & \vdots \\ 0 & \cdots & \sigma'_{\frac{M}{2}} & 0 \end{bmatrix} V \quad (2)$$

A singular value matrix (second singular value matrix) having M/2 singular values as components is indicated in the right-hand side of Equation (2), where singular values are represented by $\sigma'_k$ (k represents an integer from 1 to M/2). Individual singular values correspond to electric powers of extracted reception signals of low frequency components. Specifically, each singular value corresponds to electric power based on an independent wave configuring an extracted reception signal. A singular value decreases as a singular value number increases.

The number-of-incoming-waves estimator (circuit) 105 estimates the number of incoming waves of reception signals on the basis of matrices calculated by the matrix calculators 103 and 104. A process for estimating the number of incoming waves in the number-of-incoming-waves estimator 105 will be described below. The number-of-incoming-waves estimator (circuit) 105 includes processing circuitry, such as a programmable processor (e.g., CPU) and memory that holds the program instructions, and/or dedicated logic such as an application specific integrated circuit (ASIC).

Figure 2:
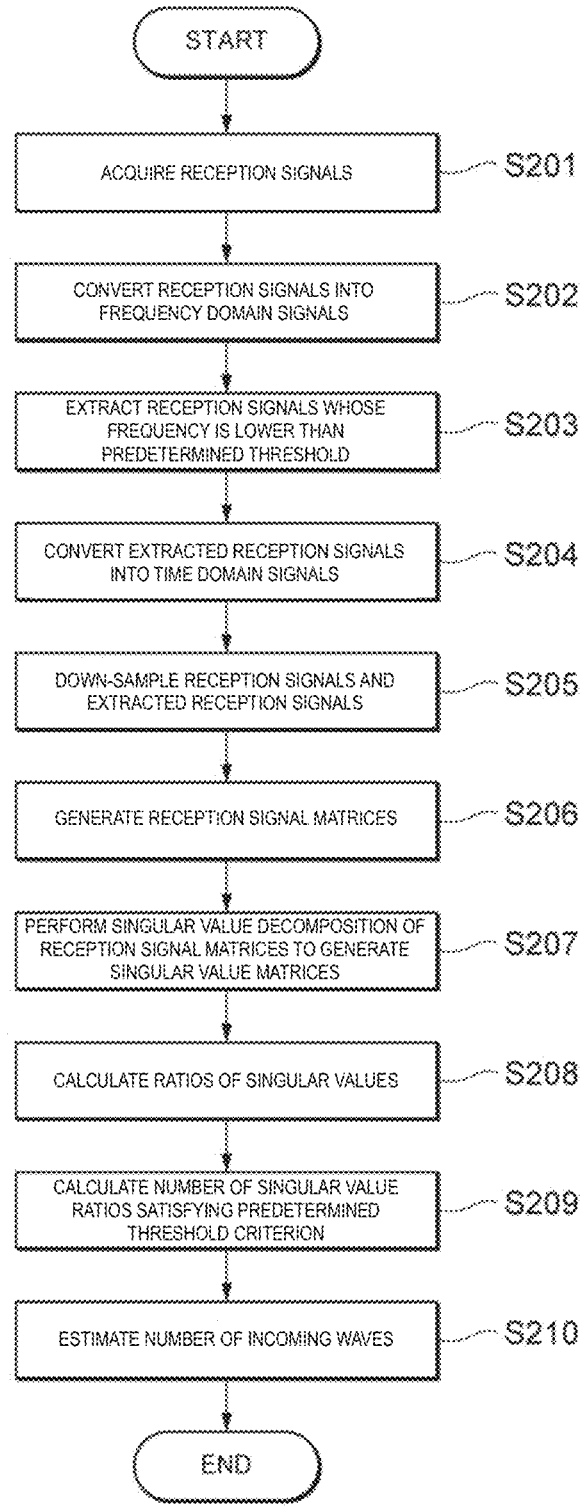
FIG. 2 is a flowchart of a process in the communication apparatus according to the first embodiment.
Figure 3:
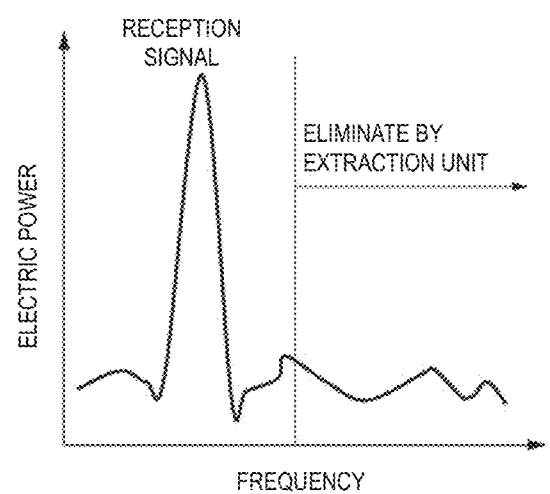
FIG. 3 is a diagram for explaining signal extraction processing in the communication apparatus according to the first embodiment.

A process performed by the communication apparatus 10 for estimating the number of incoming waves will be described with reference to FIGS. 2 to 4. FIG. 2 is a flowchart of a process in the communication apparatus 10. In step S201, the antenna 101 acquires reception signals. The acquired reception signals are converted into digital signals by the A/D converter 102.

In step S202, the frequency domain conversion unit 1041 converts the reception signals into frequency domain signals. In step S203, the extraction unit 1042 extracts reception signals whose frequency is lower than a predetermined threshold from the converted reception signals of frequency domain. FIG. 3 is a concept diagram of extraction of reception signals by the extraction unit 1042.

In step S204, the time domain conversion unit 1043 converts the extracted reception signals from frequency domain into time domain.

In step S205, the down-sampling unit 1031 down-samples the reception signals. Furthermore, the down-sampling unit 1044 down-samples the extracted reception signals.

In step S206, the matrix calculator 103 generates a reception signal matrix indicated in the left-hand side of Equation (1) from the reception signals. Furthermore, the matrix calculator 104 generates a reception signal matrix indicated in the left-hand side of Equation (2) from the extracted reception signals.

In step S207, the matrix calculator 103 performs singular value decomposition to generate a singular value matrix indicated in the right-hand side of Equation (1). Furthermore, the matrix calculator 104 performs singular value decomposition to generate a singular value matrix indicated in the right-hand side of Equation (1).

In step S208, the number-of-incoming-waves estimator 105 calculates singular value ratios $r_k$, which are the ratios of the singular values of the two generated singular value matrices. Specifically, the singular value ratios $r_k$ are calculated by Equation (3):

[Math. 3]

$$r_k = \frac{\sigma_k}{\sigma'_k}, \qquad (3)$$

where k represents an integer from 1 to M/2.

In step S209, the number-of-incoming-waves estimator 105 calculates the number of singular value ratios that meet a predetermined threshold criterion. A process for calculating the number of singular value ratios that meet a threshold criterion will be described with reference to FIG. 4.

Figure 4:
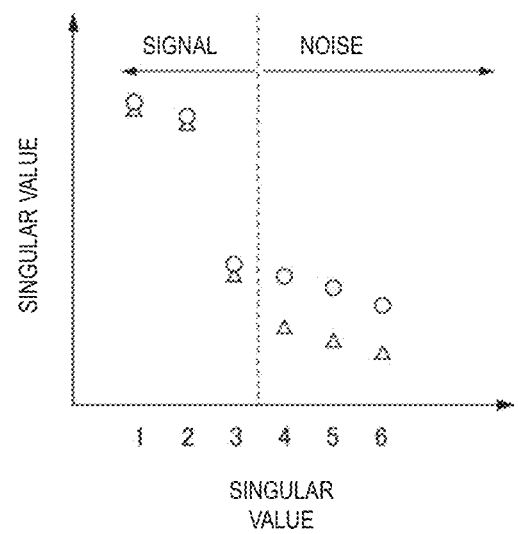
FIG. 4 is a diagram for explaining estimation of the number of waves in the communication apparatus according to the first embodiment.

In FIG. 4, singular values $\sigma_1$ to $\sigma_6$ calculated by the matrix calculator 103 when M is 12 are indicated by round plots. Furthermore, singular values $\sigma'_1$ to $\sigma'_6$ calculated by the matrix calculator 104 are indicated by triangular plots. The pair $\sigma_1$ and $\sigma'_1$, the pair $\sigma_2$ and $\sigma'_2$, and the pair $\sigma_3$ and $\sigma'_3$ each have values close to each other. Thus, the plots of each of the pairs $\sigma_1$ and $\sigma'_1$, $\sigma_2$ and $\sigma'_2$, and $\sigma_3$ and $\sigma'_3$ partially overlap.

The singular values $\sigma$ and $\sigma'$ are assigned singular value numbers in descending order of the amount of electric power. Signals whose frequency indicates a large amount of electric power out of the reception signals illustrated in FIG. 3 are signals corresponding to incoming waves. The singular values $\sigma'$ are calculated based on reception signals extracted after reception signals of high frequency are eliminated as noise by the extraction unit 1042. Thus, the value of an extracted reception signal is smaller than the value of a reception signal before extraction by the amount of noise eliminated. As a result, the value of electric power also decreases, and a singular value $\sigma'$ is therefore smaller than a singular value $\sigma$. The degree of decrease of a singular value corresponding to a wave eliminated as noise is large. Thus, the amount of decrease of a singular value corresponding to an incoming wave is small, whereas the amount of decrease of a singular value corresponding to noise is large.

When the singular value ratios $r_k$ are calculated based on Equation (3), the singular value ratios $r_k$ take a value of 1 or more. The larger the amount of decrease of the singular value $\sigma'_k$, the larger the singular value ratio $r_k$. The number-of-incoming-waves estimator 105 calculates the number of singular value ratios $r_k$ that are less than or equal to a predetermined threshold. Referring to FIG. 4, the singular value ratios $r_k$ for singular value numbers 1 to 3 meet the threshold criterion. That is, $\sigma_1$ to $\sigma_3$ represent singular values corresponding to incoming waves, and $\sigma_4$ to $\sigma_6$ represent singular values based on waves containing noise.

In step S210, the number-of-incoming-waves estimator 105 estimates the number of incoming waves by regarding the number of singular value ratios $r_k$ that meet the threshold criterion as the number of incoming waves. In the example of FIG. 4, the number of incoming waves is 3.

The communication apparatus 10 performs processing for reception signals from the antenna 101 by separating between reception signals containing noise to be processed by the matrix calculator 103 and reception signals from which noise has been eliminated by the extraction unit 1042. The communication apparatus 10 uses singular values not eigenvalues. Thus, there is no need to use a cross-correlation matrix. Even if signals are correlated with each other, the accuracy of estimation of the number of incoming waves can be improved. Furthermore, even for incoming signals with a small amount of electric power, estimation of the number of waves can be performed based on the amount of variation in singular values calculated based on the reception signals. Thus, the number of incoming waves can be estimated without being affected by the size of electric power of the reception signals. Thus, the number of incoming waves can be estimated more accurately.

A second embodiment will be described. In the second embodiment and subsequent embodiments, description of features common to the first embodiment will be omitted and only differences will be described. In particular, similar operational advantages by similar configurations will not be mentioned in individual embodiments.

Figure 5:
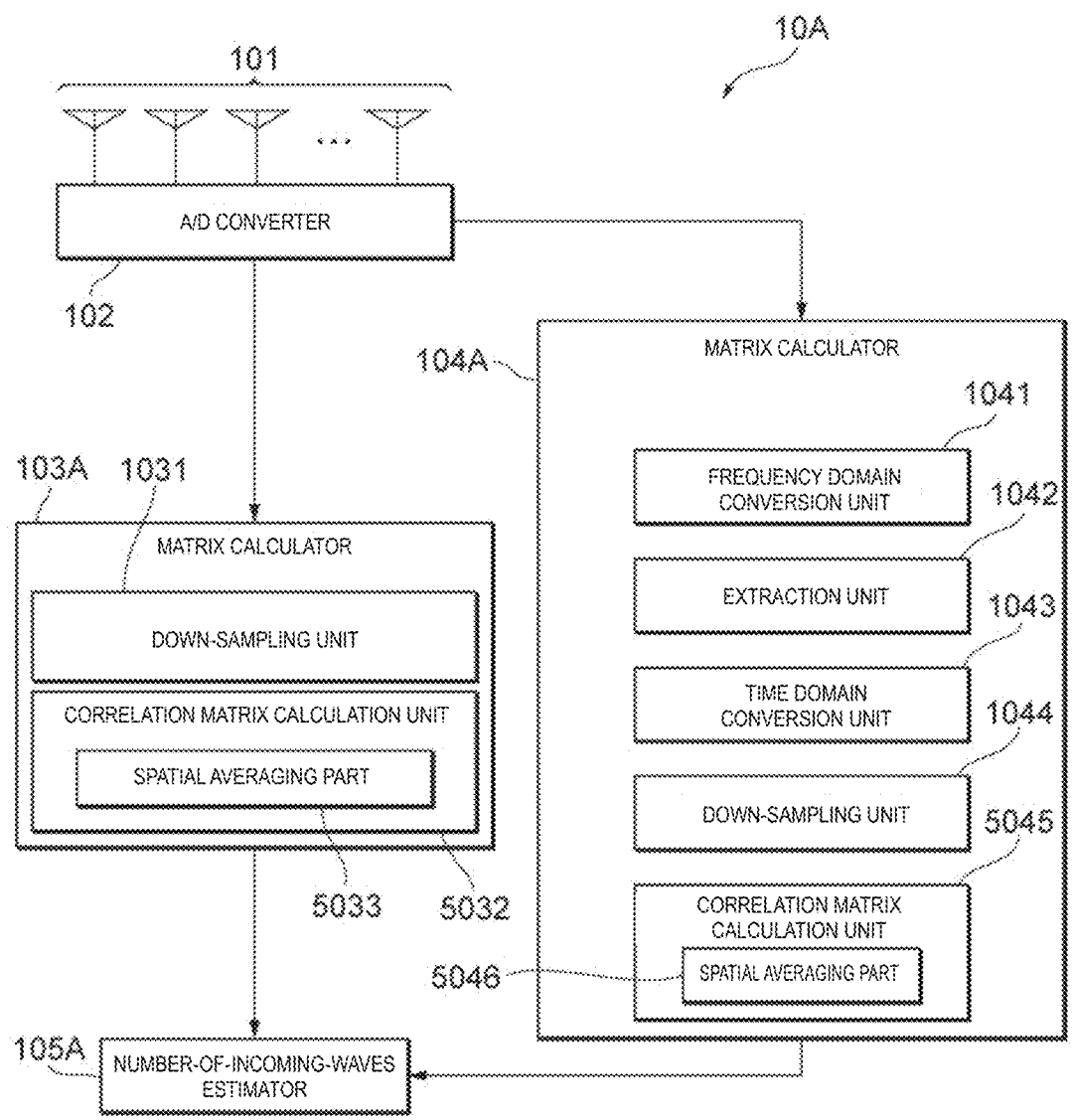
FIG. 5 is a block diagram of a communication apparatus according to a second embodiment.

FIG. 5 is a block diagram of a communication apparatus 10A according to the second embodiment. The communication apparatus 10A is different from the communication apparatus 10 in that the a matrix calculator (or circuit) 103A includes a correlation matrix calculation unit (or circuit) 5032 and a matrix calculator (or circuit) 104A includes a correlation matrix calculation unit (or circuit) 5045. Matrix calculator 103A and matric calculator 104A each include processing circuitry, such as a programmable processor (e.g., CPU) and memory that holds the program instructions, and/or dedicated logic such as an application specific integrated circuit (ASIC). Each of the units can similarly include such processing circuitry, memory, instructions and/or dedicated logic.

The correlation matrix calculation unit 5032 includes a spatial averaging part (or circuit) 5033. The correlation matrix calculation unit 5045 includes a spatial averaging part (or circuit) 5046. The spatial averaging parts 5033 and 5046 each averages signals from a sub-array, which is a group of some antenna elements of the antenna 101. For example, a moving average method for performing eigenvalue decomposition of a matrix created by dividing a covariance matrix of a plurality of correlated signals received at antennas into a plurality of matrix groups with same order and adding elements of the matrix groups is used. Thus, correlation between reception signals can be reduced. The correlation matrix calculation unit 5032 calculates a correlation matrix of reception signals. The correlation matrix calculation unit 5045 generates a correlation matrix of reception signals extracted by the extraction unit 1042.

The matrix calculator 103A generates an eigenvalue matrix (first eigenvalue matrix) of a correlation matrix calculated by the correlation matrix calculation unit 5032. The matrix calculator 104A generates an eigenvalue matrix (second eigenvalue matrix) of a correlation matrix calculated by the correlation matrix calculation unit 5045.

The number-of-incoming-waves estimator 105A estimates the number of incoming waves of reception signals on the basis of the eigenvalue matrices calculated by the matrix calculators 103A and 104A. A process for estimating the number of incoming waves in the number-of-incoming-waves estimator 105A is performed as in the first embodiment by using eigenvalues instead of singular values described in the first embodiment and using eigenvalue ratios. The number-of-incoming-waves estimator 105A includes processing circuitry, such as a programmable processor (e.g., CPU) and memory that holds the program instructions, and/or dedicated logic such as an application specific integrated circuit (ASIC).

The communication apparatus 10A is also capable of estimating the number of incoming waves without depending on the size of electric power of reception signals. Thus, the accuracy of estimation of the number of incoming waves can be improved.

For the communication apparatuses 10 and 10A, a threshold for the size of singular values or eigenvalues may be provided, in addition to singular value ratios or eigenvalue ratios. For example, a singular value or an eigenvalue is associated with reception electric power. Thus, a threshold for singular values or eigenvalues can be used so that a signal with strong reception electric power can be extracted before estimation of the number of incoming waves. Alternatively, the number of incoming waves may be estimated under the condition that the reception electric power is strong and a singular value ratio or an eigenvalue ratio meets a threshold criterion.

The communication apparatuses 10 and 10A may each include a change amount calculator (not illustrated in the drawing) that calculates the amount of change of components of a singular value matrix or an eigenvalue matrix based on reception signals. The amount of change of singular values or eigenvalues in a certain matrix may be calculated based on a ratio or a difference and used for estimation of the number of incoming waves. For example, a row including a singular value or an eigenvalue whose ratio to a singular value or an eigenvalue in the next row is maximum is found, and the number of singular values or eigenvalues in rows whose row numbers are smaller than the row number of the found row is calculated. The estimated value of the number of incoming waves may be confirmed based on the calculated number of singular values or eigenvalues and the number of incoming waves estimated by the number-of-incoming-waves estimator 105. A row including a singular value or an eigenvalue whose difference from a singular value or an eigenvalue in the next row is maximum may be calculated.

Figure 6:
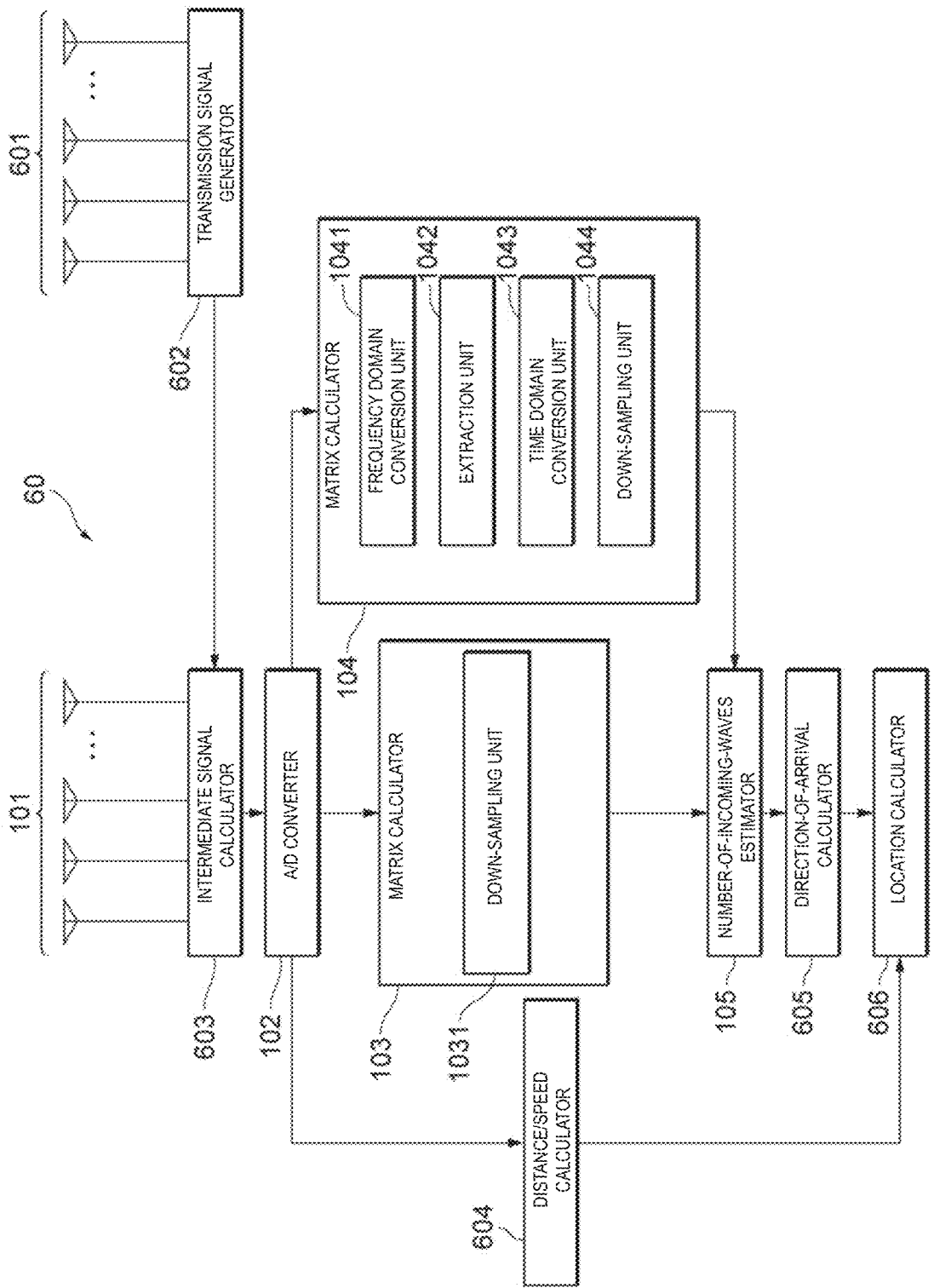
FIG. 6 is a block diagram of a communication apparatus according to a third embodiment.

A third embodiment will be described. FIG. 6 is a block diagram of a communication apparatus 60 according to the third embodiment. The communication apparatus 60 includes, in addition to the component elements of the communication apparatus 10, a transmission antenna 601, a transmission signal generator (circuit) 602, an intermediate frequency signal convertor (circuit) 603, a distance/speed calculator (circuit) 604, a direction-of-arrival calculator (circuit) 605, and a location calculator (circuit) 606. The antenna 101 is an example of a reception antenna that receives incoming waves. Transmission signal generator 602, intermediate frequency signal convertor 603, distance/speed calculator 604, direction-of-arrival calculator 605, and location calculator 606 each include processing circuitry, such as a programmable processor (e.g., CPU) and memory that holds the program instructions, and/or dedicated logic such as an application specific integrated circuit (ASIC).

The transmission antenna 601 is an array antenna that includes a plurality of antenna elements. The transmission antenna 601 transmits transmission waves to the outside of the communication apparatus 60. The frequency of a transmission wave increases with time in a linear manner. That is, the communication apparatus 60 is an example of an FMCW radar.

The transmission signal generator 602 generates transmission signals for generating transmission waves to be transmitted by the transmission antenna 601. A transmission signal is a chirp signal for increasing the frequency of a transmission wave in a linear manner. A transmission signal includes a plurality of chirp signals for increasing frequency in the same manner.

The intermediate frequency signal convertor 603 calculates an intermediate frequency of a reception signal and a transmission signal on the basis of a reception signal from the antenna 101 and a transmission signal from the transmission signal generator. A reception signal has a waveform of a time-delayed chirp signal as a transmission signal. An intermediate frequency signal represents a difference between the frequency of a transmission signal and the frequency of a reception signal at a point in time. That is, the frequency of a calculated intermediate frequency signal maintains at a fixed value for a certain period of time. An intermediate frequency signal is converted into a digital signal by the A/D converter 102 and output to the distance/speed calculator 604.

The distance/speed calculator 604 calculates the distance from the communication apparatus 60 to an object reflecting a transmission wave on the basis of an intermediate frequency signal. For calculation of distance, the distance to an object is calculated by considering a frequency difference between a transmission signal and a reception signal corresponding to the transmission signal, that is, the frequency of an intermediate frequency signal, corresponding to the time from reflection of a transmission wave on the object to incidence to the antenna 101 as an incoming wave. In the case where there are a plurality of objects, the distance/speed calculator 604 converts intermediate frequency signals into frequency domain signals by Fourier transform or the like and calculates distances for the individual intermediate frequency signals, so that the distance to each of the objects can be calculated.

Furthermore, in the case where the distance/speed calculator 604 calculates speed, the speed of an object is calculated on the basis of a phase difference between an intermediate frequency signal based on a chirp signal and an intermediate frequency signal based on another chirp signal. In the case where there are a plurality of objects, the speed of each of the objects is calculated by performing Fourier transform (Doppler FFT) on a result of a Fourier transform (distance FFT) of an intermediate frequency signal performed on the object.

The direction-of-arrival calculator 605 estimates the direction of arrival using a method included in a super-resolution algorithm such as a MUSIC method on the basis of the number of incoming waves estimated by the number-of-incoming-waves estimator 105. The direction of arrival represents the direction in which an object is located.

The location calculator 606 calculates the location of an object on the basis of the distance and speed of an object calculated by the distance/speed calculator 604 and the direction of the object calculated by the direction-of-arrival calculator 605.

In the communication apparatus 60, the number-of-incoming-waves estimator 105 estimates the number of waves with high accuracy. Thus, resolution and accuracy as a radar can be improved.

Furthermore, estimation of the number of incoming waves may be performed by a communication apparatus whose antenna 101 includes a function of the transmission antenna 601 of the communication apparatus 60. Such a communication apparatus recognizes an object located within a predetermined range by emitting a transmission wave and detecting an incoming wave reflected from the object.

In the communication apparatus, the antenna 101 transmits transmission waves and receives incoming waves. The communication apparatus includes the matrix calculator 103 or the matrix calculator 103A as a first matrix calculator, and the first matrix calculator calculates a first matrix having singular values or eigenvalues on the basis of reception signals of incoming waves.

The communication apparatus includes the matrix calculator 104 or the matrix calculator 104A as a second matrix calculator. The second matrix calculator extracts reception signals of a specific frequency from reception signals received from the antenna 101 and calculates a second matrix having singular values or eigenvalues on the basis of the extracted reception signals.

The communication apparatus includes the number-of-incoming-waves estimator 105 or the number-of-incoming-waves estimator 105A as a number-of-incoming-waves estimator that estimates the number of incoming waves on the basis of the first matrix and the second matrix.

The extraction of reception signals of the specific frequency by the second matrix calculator includes extraction of signals whose frequency is higher than a predetermined threshold by the extraction unit 1042. At this time, a singular value or an eigenvalue in the first matrix is compared with a singular value or an eigenvalue in the second matrix when only a high frequency signal whose frequency is equal to or higher than the predetermined threshold is extracted.

Explanation will be provided below using a singular value ratio as in the first embodiment. Singular values $\sigma'$ in this case are calculated based on reception signals of low frequency extracted by the extraction unit 1042 from reception signals. Thus, the value of an extracted reception signal is smaller than the value of a reception signal before extraction by the amount corresponding to a component eliminated to be used for estimation of the number of waves from the reception signal. As a result, the value of electric power also decreases, and a singular value $\sigma'$ is therefore smaller than a singular value $\sigma$. The degree of decrease of a singular value corresponding to a wave eliminated as noise is large. Thus, the amount of decrease of a singular value corresponding to an incoming wave is large, whereas the amount of decrease of a singular value corresponding to noise is small.

At this time, the number-of-incoming-waves estimator 105 calculates the number of singular value ratios $r_k$ that are equal to or more than a predetermined threshold. Thus, the number of singular values whose amount of decrease is large can be calculated. The number-of-incoming-waves estimator estimates the number of incoming waves by regarding the number of singular values whose amount of decrease is large as the number of incoming waves.

Figure 7:
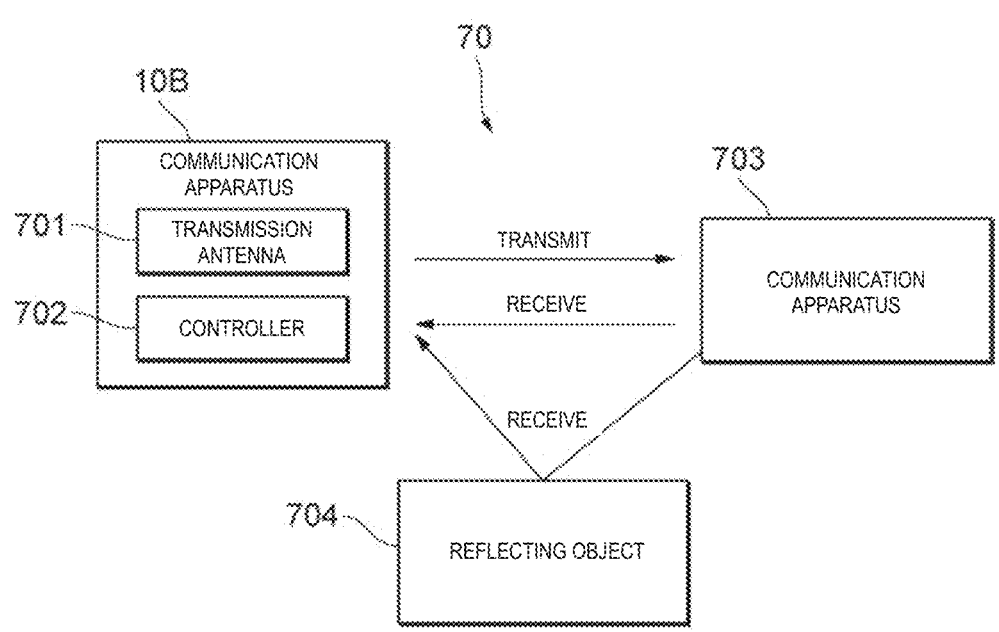
FIG. 7 is a diagram for explaining a communication system including a communication apparatus according to a fourth embodiment.

A fourth embodiment will be described. FIG. 7 is a schematic diagram of a communication system 70. The communication system 70 includes a communication apparatus 10B and a communication apparatus 703. The communication apparatus 10B includes, in addition to the component elements of the communication apparatus 10 according to the first embodiment, a transmission antenna 701 and a controller 702. An antenna (not illustrated in the drawing) of the communication apparatus 10B functions as a reception antenna that receives incoming waves. In the case where the communication apparatus 10B receives signals from the communication apparatus 703, the communication apparatus 10B estimates the direction of arrival based on the number of incoming waves estimated by the number-of-incoming-waves estimator 105. The controller 702 is capable of causing the peak of the directivity of an antenna to be directed to the estimated direction of arrival. Thus, a signal from the communication apparatus 703 can be received efficiently, and communication efficiency can be improved. Furthermore, the controller 702 is also capable of controlling the directivity of the transmission antenna 701 such that a strong transmission wave can be directed to the communication apparatus 703. Controller 703 includes processing circuitry, such as a programmable processor (e.g., CPU) and memory that holds the program instructions, and/or dedicated logic such as an application specific integrated circuit (ASIC).

Incoming waves received by the communication apparatus 10B may include direct waves arriving directly from the communication apparatus 703 and multipath waves and interference waves generated by reflection by a reflecting object 704. In this case, the communication apparatus 10B is also capable of estimating the number of incoming waves accurately.

The communication system 70 is, for example, a system in which the communication apparatus 10B is a portable communication apparatus such as a smartphone and the communication apparatus 703 is an apparatus that transmits radio waves as a base station for allowing the communication apparatus 10B to connect to a network.

Exemplary embodiments of the present disclosure have been described above. The communication apparatus 10 includes the plurality of antennas 101, the matrix calculator 103 that calculates, based on reception signals received from the antennas 101, a first matrix having singular values of a reception signal matrix, the matrix calculator 104 that extracts reception signals whose frequency is within a specific frequency range from the reception signals and calculates, based on the extracted reception signals, a second matrix having singular values of a reception signal matrix, and the number-of-incoming-waves estimator 105 that estimates, based on the first matrix and the second matrix, the number of incoming waves of the reception signals.

Accordingly, the number of waves can be estimated based on the amount of change of singular values or eigenvalues calculated based on the reception signals. Thus, the number of incoming waves can be estimated without being affected by the size of electric power of the reception signals. Therefore, the number of incoming waves can be estimated more accurately.

In the communication apparatus 10, the first matrix is a first singular value matrix, the second matrix is a second singular value matrix, and the number-of-incoming-waves estimator 105 estimates, based on a first singular value in the first singular value matrix, a second singular value in the second singular value matrix corresponding to the first singular value, and a first threshold, the number of waves of the reception signals.

With the use of singular values, even in the case where signals received by the individual antennas 101 are correlated with each other, the number of incoming waves can be estimated.

In the communication apparatus 10, the first threshold is a threshold for a singular value ratio, which is a ratio of the first singular value to the second singular value. The number-of-incoming-waves estimator 105 calculates the singular value ratio, and estimates, based on the singular value ratio and the first threshold, the number of incoming waves of the reception signals.

With the use of ratio, even in the case where the size of electric power of a reception signal corresponding to the first singular value is small, variations in the second singular value can be calculated. Thus, the number of incoming waves using singular values can be estimated in the case where electric power of a reception signal is small.

The communication apparatus 10A includes the plurality of antennas 101, the matrix calculator 103A that calculates, based on reception signals received from the antennas 101, a first matrix having eigenvalues of a reception signal matrix, the matrix calculator 104A that extracts reception signals whose frequency is within a specific frequency range from the reception signals and calculates, based on the extracted reception signals, a second matrix having eigenvalues of a reception signal matrix, and the number-of-incoming-waves estimator 105A that estimates, based on the first matrix and the second matrix, the number of incoming waves of the reception signals.

In the communication apparatus 10A, the first matrix is a first eigenvalue matrix, the second matrix is a second eigenvalue matrix, and the number-of-incoming-waves estimator 105A estimates, based on a first eigenvalue in the first eigenvalue matrix, a second eigenvalue in the second eigenvalue matrix corresponding to the first eigenvalue, and a second threshold, the number of waves of the reception signals.

In the communication apparatus 10A, the second threshold is a threshold for an eigenvalue ratio, which is a ratio of the first eigenvalue to the second eigenvalue. The number-of-incoming-waves estimator 105A calculates the eigenvalue ratio and estimates, based on the eigenvalue ratio and the second threshold, the number of incoming waves of the reception signals. Thus, the number of incoming waves using eigenvalues can be estimated in the case where electric power of a reception signal is small.

The communication apparatus 10A further includes the spatial averaging parts 5033 and 5046 that perform spatial averaging processing for the reception signals. Thus, correlation between the reception signals at antenna elements of the antenna 101 can be reduced. By reducing the correlation between the reception signals, the accuracy of estimation of the number of waves can be improved.

In the communication apparatuses 10 and 10A, the matrix calculators 103 and 103A each include the down-sampling unit 1031 that down-samples the reception signals to generate a reception signal matrix. The matrix calculators 104 and 104A each further include the down-sampling unit 1044 that down-samples the extracted reception signals to generate a reception signal matrix. Thus, two signals having different singular values corresponding to noise can be extracted.

In the communication apparatuses 10 and 10A, the matrix calculators 104 and 104A each further include the frequency domain conversion unit 1041 that converts signals of time domain into signals of frequency domain and the time domain conversion unit 1043 that converts signals of frequency domain into signals of time domain. The frequency domain conversion unit 1041 converts the reception signals into reception signals of frequency domain. The extraction unit 1042 generates, based on the reception signals of frequency domain, extracted reception signals of frequency domain. The time domain conversion unit 1043 converts the extracted reception signals of frequency domain into extracted reception signals of time domain. The matrix calculators 104 and 104A each calculate, based on the extracted reception signals of time domain, the second matrix of the reception signal matrix.

In the communication apparatuses 10 and 10A, the number-of-incoming-waves estimator 105 may estimate, based on the first matrix, the second matrix, and a third threshold, which is a threshold for singular values or eigenvalues of the first matrix and the second matrix, the number of incoming waves of the reception signals. Thus, the number of incoming waves can be estimated more accurately.

The communication apparatuses 10 and 10A each may further include a change amount calculator that calculates the amount of change of singular values or eigenvalues in the first matrix. The number-of-incoming-waves estimator 105 may estimate, based on the first matrix, the second matrix, and the amount of change, the number of waves of the reception signals. Thus, the number of incoming waves can be estimated more accurately. At this time, the amount of change may be represented by a ratio or difference of the singular values or the eigenvalues.

The communication apparatus 60 includes the transmission signal generator 602 that generates a transmission signal, the transmission antenna 601 that transmits a transmission signal as a transmission wave to an object, the intermediate frequency signal convertor 603 that converts a mixture of the transmission signal and a reception signal into an intermediate frequency signal having an intermediate frequency, the distance/speed calculator 604 that calculates, based on the intermediate frequency signal, the distance to the object, the direction-of-arrival calculator 605 that calculates, based on the number of incoming waves estimated by the number-of-incoming-waves estimator 105, the direction of arrival of an incoming wave generated by reflection of the transmission wave on the object, and the location calculator 606 that calculates, based on the distance and the direction of arrival, the location of the object.

Accordingly, the location of the object can be estimated based on the number of incoming waves estimated more accurately by the number-of-incoming-waves estimator 105. Thus, the resolution and accuracy of the communication apparatus 60 as a radar can be improved.

The communication apparatus 10B further includes the controller 702 that generates a control signal for controlling, based on the direction of arrival, the reception direction of a reception wave or the transmission direction of a transmission wave. Thus, the directivity of the antenna 101 can be controlled, and communication efficiency can be improved. Furthermore, the directivity of the transmission antenna 701 can also be controlled, and communication efficiency can be improved.

Each of the embodiments described above is intended for easy understanding of the present disclosure and is not intended for limiting the present disclosure. The present disclosure can be modified/improved without departing from the gist thereof and includes equivalents thereof. That is, modifications in design that are made to the embodiments by those skilled in the art are also included in the scope of the present disclosure as long as such modifications have features of the present disclosure. For example, elements included in each of the embodiments, arrangements of the elements, conditions, and the like are not limited to those in the examples described above and may be changed in an appropriate manner. Furthermore, each of the embodiments is an example, and it is obvious that the configurations according to the different embodiments may be partially replaced or combined with each other, these configurations are also included in the scope of the present disclosure as long as they have features of the present disclosure.

REFERENCE SIGNS LIST

10, 10A, 10B, 60 . . . communication apparatus, 101 . . . antenna, 102 . . . A/D converter, 103, 103A, 104, 104A . . . matrix calculator, 105, 105A . . . number-of-incoming-waves estimator, 1031, 1044 down-sampling unit, 1041 . . . frequency domain conversion unit, 1042 . . . extraction unit, 1043 . . . time domain conversion unit

The invention claimed is:

1. A communication apparatus comprising:
a plurality of antennas; and
circuitry configured to:
calculate, based on reception signals received from the antennas, a first matrix having singular values of a first reception signal matrix;
extract reception signals whose frequency is within a specific frequency range from the reception signals;
calculate, based on the extracted reception signals, a second matrix having singular values of a second reception signal matrix; and
estimate, based on a comparison of the first matrix and the second matrix, a number of incoming waves of the reception signals.

2. The communication apparatus according to claim 1, wherein the first matrix is a first singular value matrix, wherein the second matrix is a second singular value matrix, and
wherein the circuitry is further configured to estimate, based on a first singular value in the first singular value matrix, a second singular value in the second singular value matrix corresponding to the first singular value, and a first threshold, the number of waves of the reception signals.

3. The communication apparatus according to claim 2, wherein the first threshold is a threshold for a singular value ratio, which is a ratio of the first singular value to the second singular value, and
wherein the circuitry is further configured to calculate the singular value ratio and estimate, based on the singular value ratio and the first threshold, the number of incoming waves of the reception signals.

4. The communication apparatus according to claim 2, wherein the circuitry is further configured to:
down-sample the reception signals to generate the first reception signal matrix; and
down-sample the extracted reception signals to generate the second reception signal matrix.

5. The communication apparatus according to claim 2, wherein the circuitry is further configured to:
extract the reception signals whose frequency is within the specific frequency range from the reception signals;
convert signals of time domain into signals of frequency domain;
convert signals of frequency domain into signals of time domain;
convert the reception signals into reception signals of frequency domain;
generate, based on the reception signals of frequency domain, extracted reception signals of frequency domain;
convert the extracted reception signals of frequency domain into extracted reception signals of time domain; and
calculate, based on the extracted reception signals of time domain, the second matrix of the second reception signal matrix.

6. The communication apparatus according to claim 2, wherein the circuitry is further configured to estimate, based on the first matrix, the second matrix, and a third threshold, which is a threshold for singular values or eigenvalues of the first matrix and the second matrix, the number of incoming waves of the reception signals.

7. The communication apparatus according to claim 2, wherein the circuitry is further configured to:
calculate the amount of change of singular values or eigenvalues in the first matrix; and
estimate, based on the first matrix, the second matrix, and the amount of change, the number of waves of the reception signals.

8. The communication apparatus according to claim 1, wherein the circuitry is further configured to:
down-sample the reception signals to generate the first reception signal matrix; and
down-sample the extracted reception signals to generate the second reception signal matrix.

9. The communication apparatus according to claim 1, wherein the circuitry is further configured to:
extract the reception signals whose frequency is within the specific frequency range from the reception signals;
convert signals of time domain into signals of frequency domain;
convert signals of frequency domain into signals of time domain;
convert the reception signals into reception signals of frequency domain;

generate, based on the reception signals of frequency domain, extracted reception signals of frequency domain;
convert the extracted reception signals of frequency domain into extracted reception signals of time domain; and
calculate, based on the extracted reception signals of time domain, the second matrix of the second reception signal matrix.

10. The communication apparatus according to claim 1, wherein the circuitry is further configured to estimate, based on the first matrix, the second matrix, and a third threshold, which is a threshold for singular values or eigenvalues of the first matrix and the second matrix, the number of incoming waves of the reception signals.

11. The communication apparatus according to claim 1, wherein the circuitry is further configured to:
calculate the amount of change of singular values or eigenvalues in the first matrix; and
estimate, based on the first matrix, the second matrix, and the amount of change, the number of waves of the reception signals.

12. The communication apparatus according to claim 11, wherein the amount of change is represented by a difference between the singular values or the eigenvalues.

13. The communication apparatus according to claim 11, wherein the amount of change is represented by a ratio of the singular values or the eigenvalues.

14. The communication apparatus according to claim 1, wherein the antennas are reception antennas that each receive, as the reception signal, an incoming wave generated by reflection of a transmission wave on an object, and
wherein the communication apparatus further comprises:
a transmission signal generator that generates a transmission signal; and
a transmission antenna that transmits the transmission signal as the transmission wave to the object,
wherein the circuitry is further configured to:
convert a mixture of the transmission signal and the reception signal into an intermediate frequency signal having an intermediate frequency;
calculate, based on the intermediate frequency signal, a distance to the object;
calculate, based on the number of incoming waves estimated, a direction of arrival of the incoming wave from the object; and
calculate, based on the distance and the direction of arrival, a location of the object.

15. The communication apparatus according to claim 1, wherein the antennas are reception antennas that each receive, as the reception signal, an incoming wave generated by reflection of a transmission wave on an object, and
wherein the communication apparatus further comprises:
a transmission signal generator that generates a transmission signal; and
a transmission antenna that transmits the transmission signal as the transmission wave to the object,
wherein the circuitry is further configured to:
calculate, based on the number of incoming waves estimated, a direction of arrival of the incoming wave from the object; and
generate a control signal for controlling, based on the direction of arrival, a reception direction of the incoming wave or a transmission direction of the transmission wave.

16. A communication apparatus comprising:
a plurality of antennas; and
circuitry configured to:
calculate, based on reception signals received from the antennas, a first matrix having eigenvalues of a first reception signal matrix;
extract reception signals whose frequency is within a specific frequency range from the reception signals;
calculate, based on the extracted reception signals, a second matrix having eigenvalues of a second reception signal matrix; and
estimate, based on a comparison of the first matrix and the second matrix, a number of incoming waves of the reception signals.

17. The communication apparatus according to claim 16, wherein the first matrix is a first eigenvalue matrix,
wherein the second matrix is a second eigenvalue matrix, and
wherein the circuitry is further configured to estimate, based on a first eigenvalue in the first eigenvalue matrix, a second eigenvalue in the second eigenvalue matrix corresponding to the first eigenvalue, and a second threshold, the number of incoming waves of the reception signals.

18. The communication apparatus according to claim 5, wherein the second threshold is a threshold for an eigenvalue ratio, which is a ratio of the first eigenvalue to the second eigenvalue, and
wherein the circuitry is further configured to calculate the eigenvalue ratio and estimates, based on the eigenvalue ratio and the second threshold, the number of incoming waves of the reception signals.

19. The communication apparatus according to claim 17, wherein the circuitry is further configured to perform spatial averaging processing for the reception signals.

20. A communication method for use in a communication apparatus, comprising:
calculating, based on reception signals received from a plurality of antennas, a first matrix having singular values or eigenvalues of a first reception signal matrix;
extracting, based on the reception signals, reception signals whose frequency is within a specific frequency range and calculating a second matrix having singular values or eigenvalues of a second reception signal matrix having components based on the extracted reception signals,
the calculating the second matrix including
converting the reception signals into reception signals of frequency domain,
generating, based on the reception signals of frequency domain, extracted reception signals of frequency domain,
converting the extracted reception signals of frequency domain into extracted reception signals of time domain, and
calculating, based on the extracted reception signals of time domain, the second matrix of the second reception signal matrix; and
estimating, based on a comparison of the first matrix and the second matrix, the number of incoming waves of the reception signals.

* * * * *